Aug. 5, 1924.  
J. JANES  
WOOD CARVING MACHINE  
Filed April 2, 1921    8 Sheets-Sheet 5
1,503,899
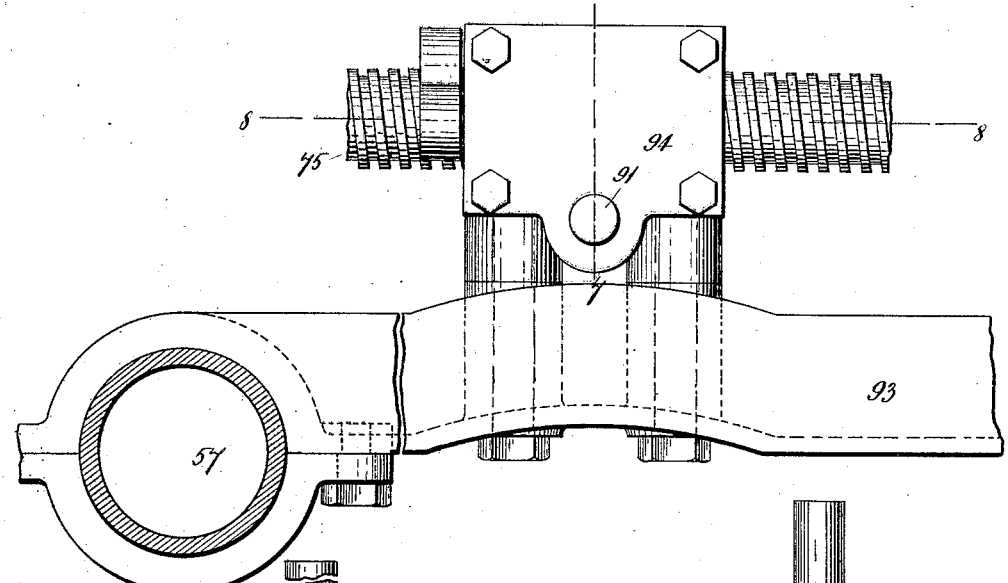
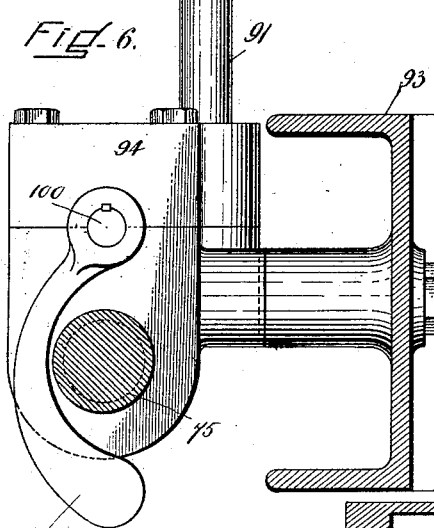
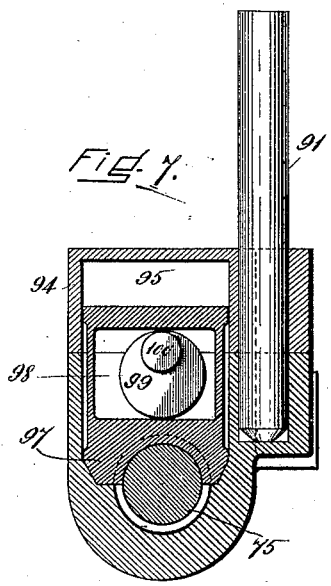
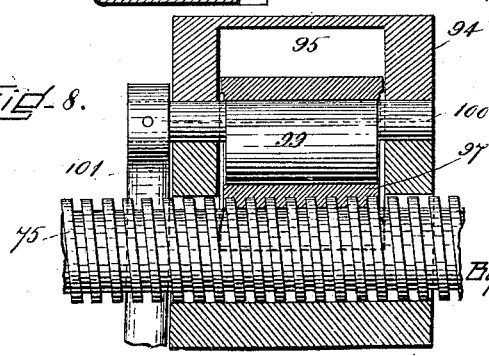
INVENTOR  
Joseph Janes  
By  
ATTORNEYS Aug. 5, 1924.  
J. JANES  
1,503,899  
WOOD CARVING MACHINE  
Filed April 2, 1921   8 Sheets-Sheet 6
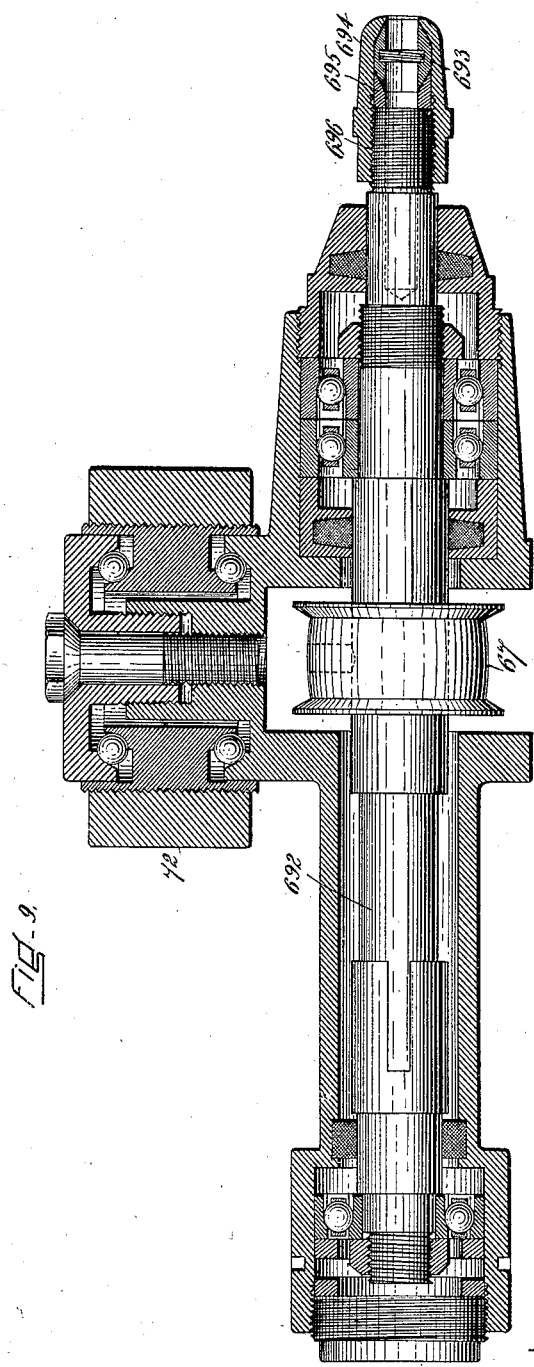
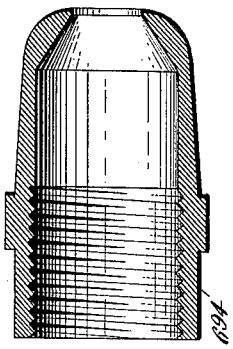
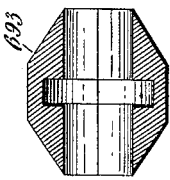
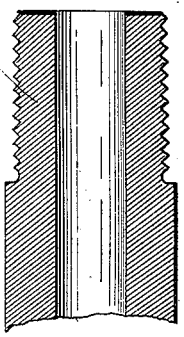
INVENTOR=
Joseph Janes
By
ATTORNEYS

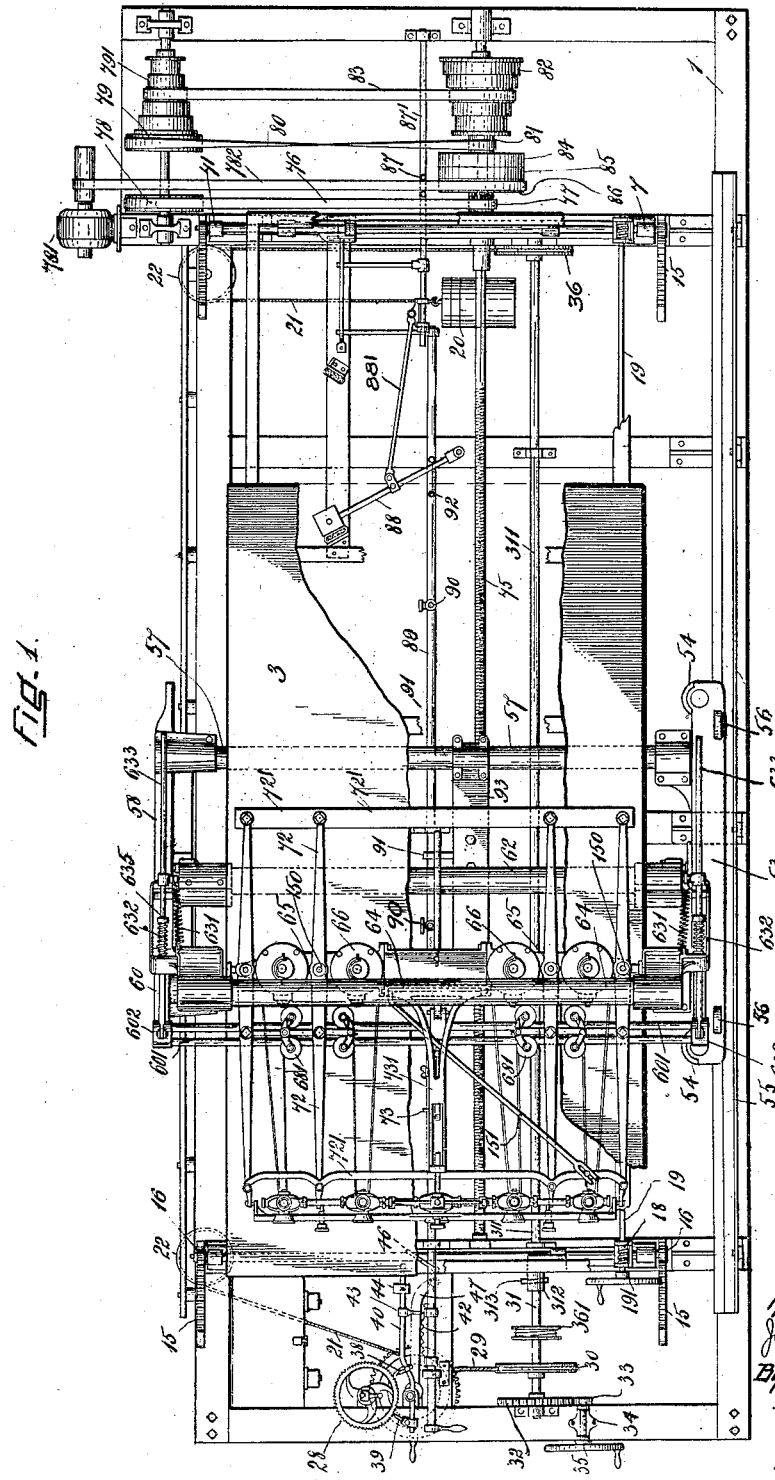

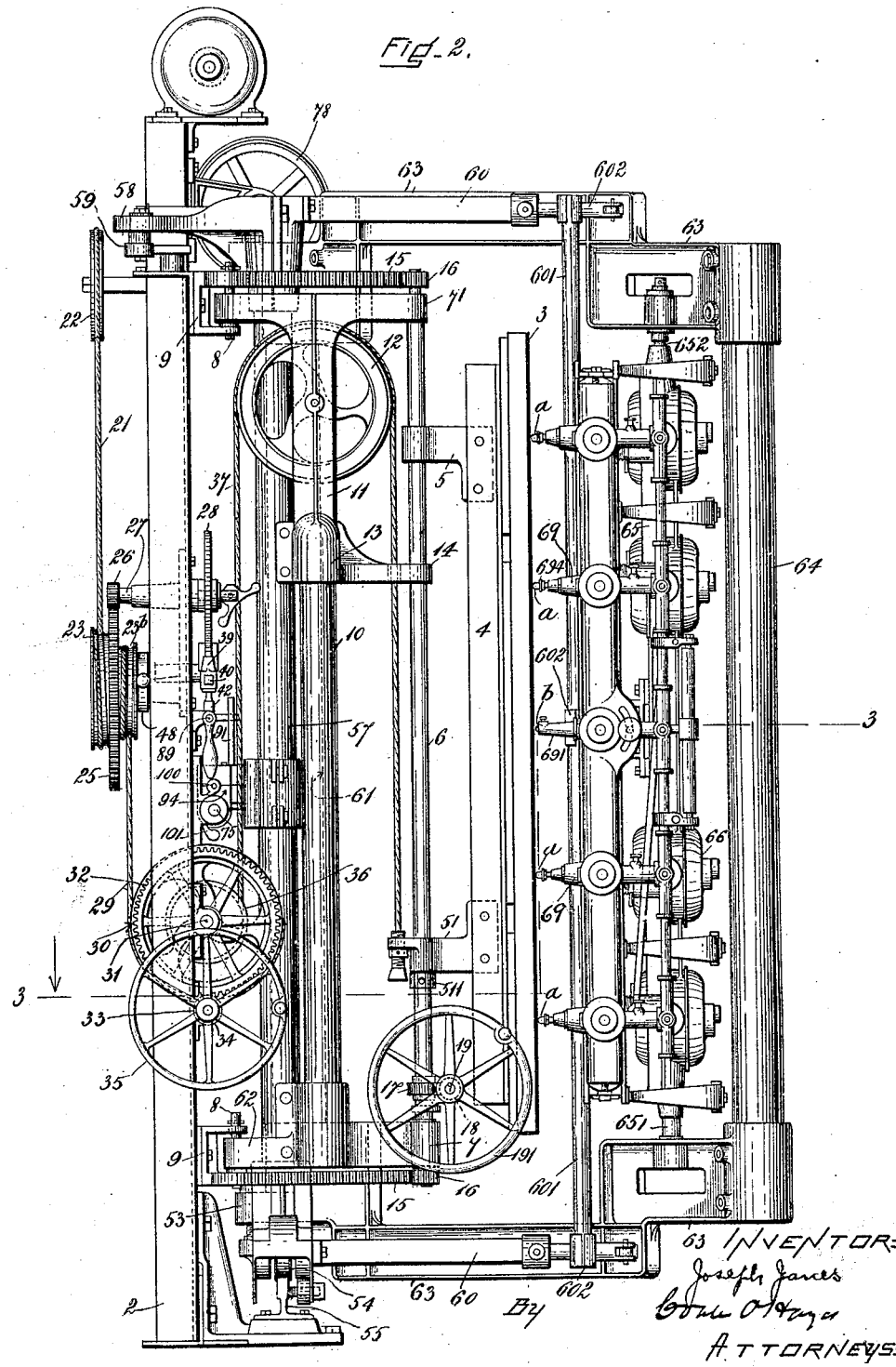

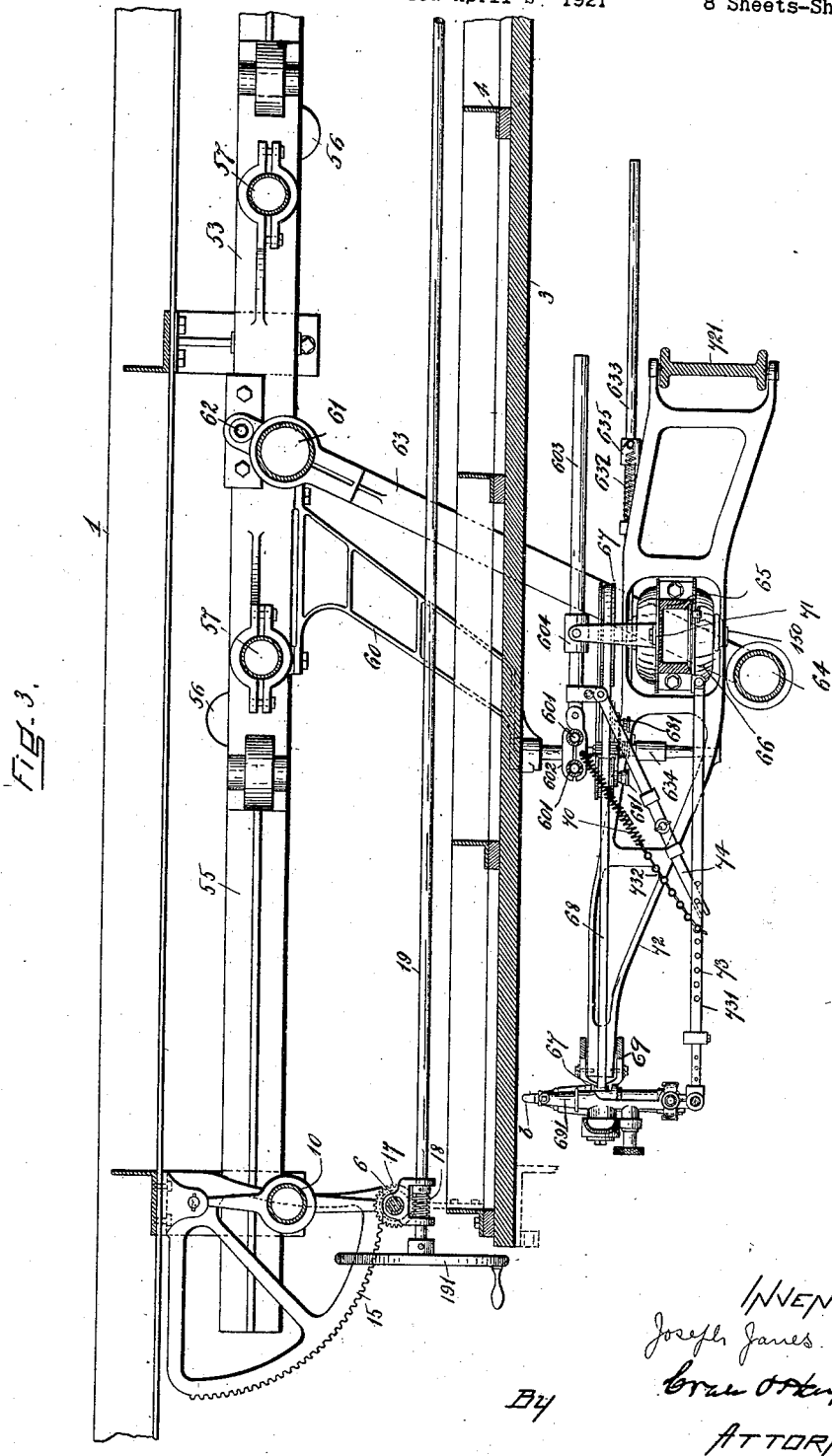

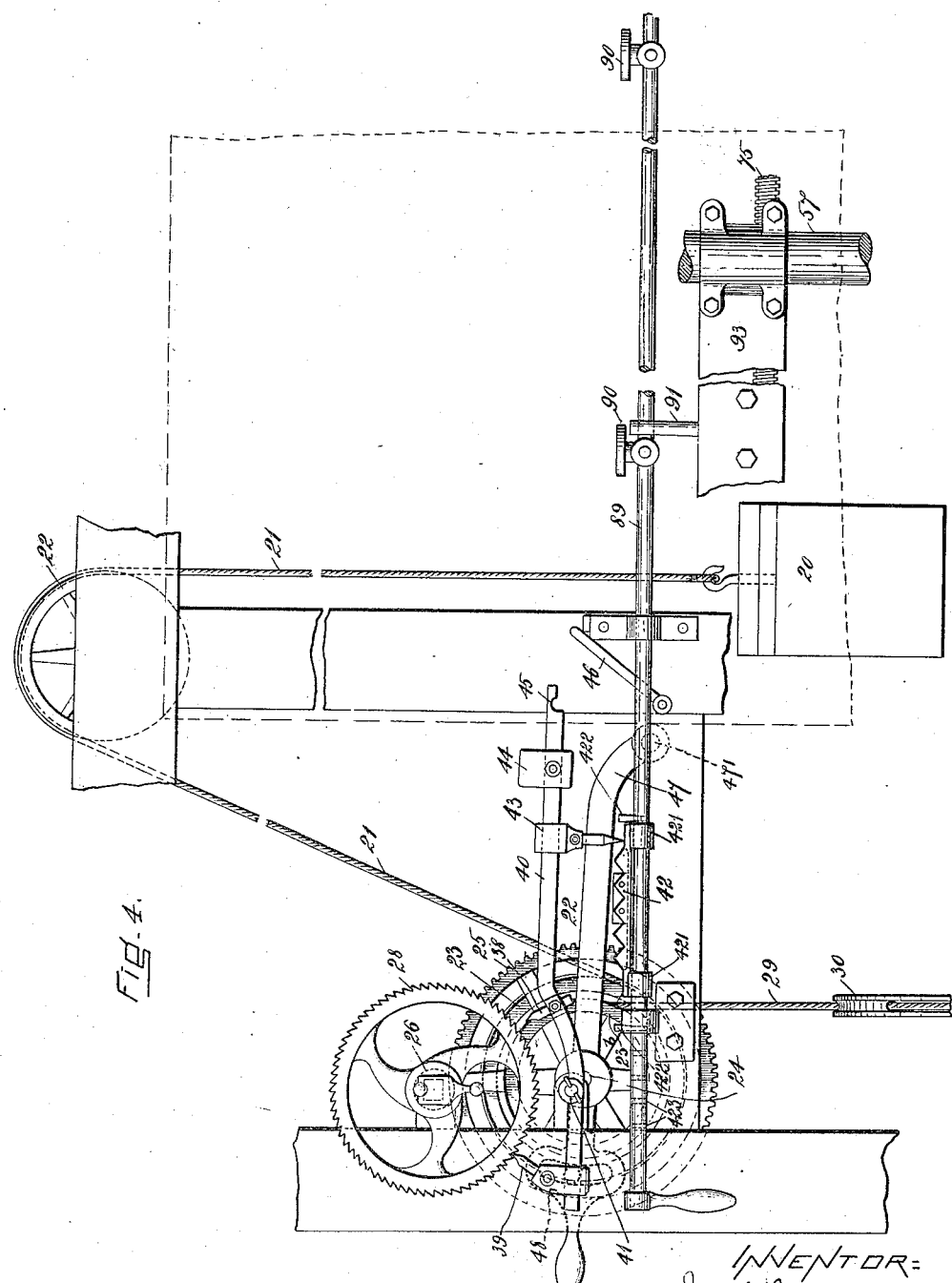

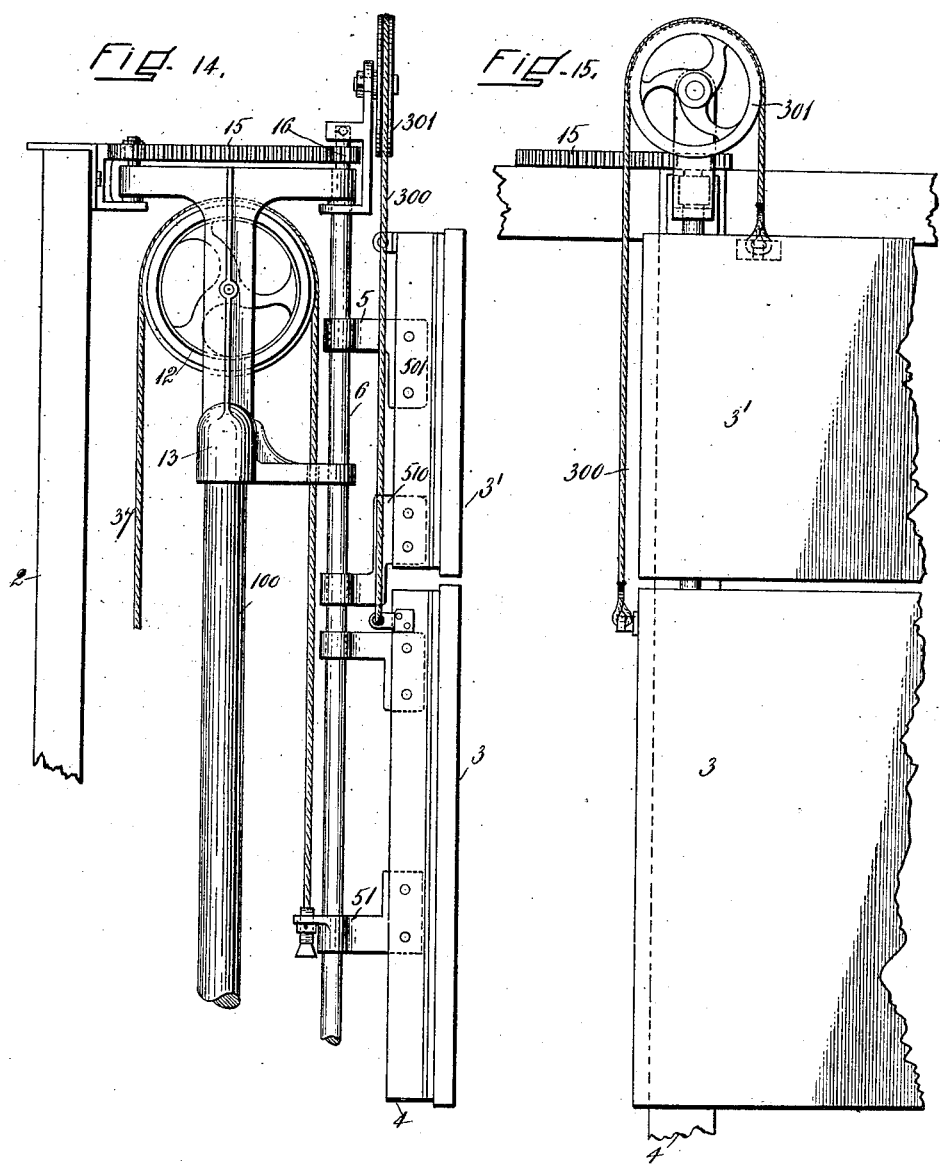

Aug. 5, 1924.  
J. JANES  
1,503,899  
WOOD CARVING MACHINE  
Filed April 2, 1921   8 Sheets-Sheet 8

INVENTOR=  
Joseph Janes.  
By  
ATTORNEYS=

Patented Aug. 5, 1924.

1,503,899

UNITED STATES PATENT OFFICE.

JOSEPH JANES, OF SOMERVILLE, MASSACHUSETTS, ASSIGNOR, BY MESNE ASSIGN-MENTS, TO IRVING & CASSON-A. H. DAVENPORT CO., OF BOSTON, MASSACHUSETTS, A CORPORATION OF MASSACHUSETTS.

WOOD-CARVING MACHINE.

Application filed April 2, 1921. Serial No. 457,900.

*To all whom it may concern:*

Be it known that I, JOSEPH JANES, of Somerville, in the county of Middlesex and State of Massachusetts, a citizen of the United States, have invented a new and useful Improvement in Wood-Carving Machines, of which the following is a specification.

My invention relates to a machine which will automatically carve or engrave wood more particularly, although it may be used for carving other materials. It comprises two moving frames, one a work support to which the work may be attached in any convenient way, and which as shown has a vertical feed, the other a tool support which may carry a desired number of tools, and has a horizontal feed.

My invention will be understood by reference to the drawings in which it is shown in its preferred form.

Figure 1 is a front elevation.

Fig. 2 is an elevation of the left hand end of the machine (see Fig. 1).

Fig. 3 is a horizontal section on line 3—3 of Fig. 2.

Fig. 4 is a detail showing a portion of the table-lifting mechanism.

Fig. 5 is a detail of the tool frame feed.

Fig. 6 is an end view of the mechanism of Fig. 5.

Figs. 7 and 8 are sections on lines 7—7 and 8—8, respectively, of Fig. 5.

Figs. 9 to 13 are details of the tool holder.

Figs. 14 and 15 show a construction in which right and left carvings may be obtained from one pattern.

Figure 16:
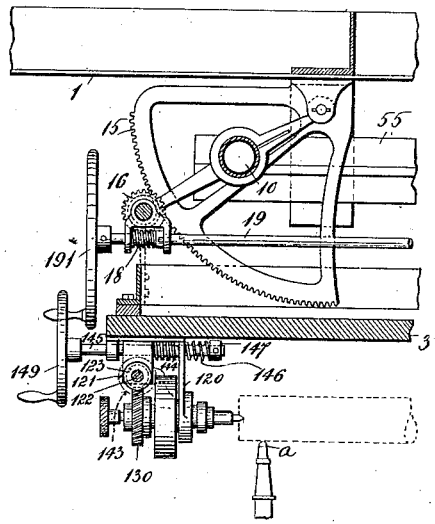
Figure 17:
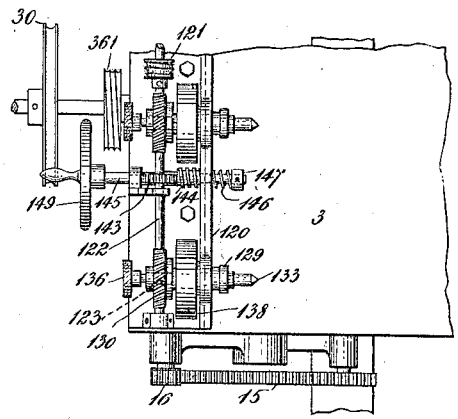

Fig. 16 is a horizontal sectional detail showing a support for round work;

Fig. 17 being a front elevation of the detail of Fig. 16, and

Figure 18:
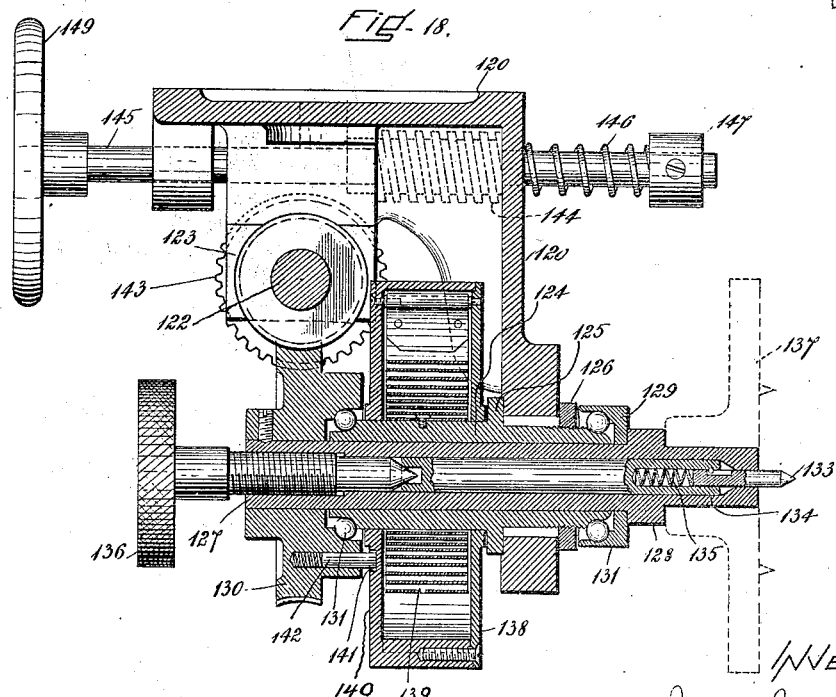

Fig. 18 is an enlarged section of a work holder.

The various parts are mounted in a frame the parts of which are marked 1, various connecting angle irons being marked 2.

The work support comprises an easel 3, having stiffeners in the shape of angle irons 4 suitably attached thereto, these angle irons having brackets 5—51 arranged to slide on vertical rods 6. 511 is an adjustable collar on which the bracket 51 may rest if desired. The vertical rods 6 are mounted between swingable supports 7—71 which supports are pivoted on pins 8 in brackets 9 attached to the frame 1. These parts are duplicated at the farther end of the machine. Also supported between these brackets are posts 10 and extensions thereof 11 which carry pulleys 12. Each extension 11 has at its lower end a cap 13 having an arm 14 the end of which surrounds one of the vertical rods 6 and assists in bracing it.

The brackets 9 also carry segmental racks 15, one near the top and the other near the bottom of the machine, and in mesh with these racks are pinions 16 mounted on the ends of the rods 6, one at each end thereof. The rods 6 also have worm gears 17 in mesh with worms 18 on rods 19 which extend across the machine, and it also carries a hand wheel 191, so that by turning the hand wheel the location of the work support may be adjusted in relation to the reach of the tools, according to the thickness of the stock, etc. This adjustment is made before the carving begins. This is also useful in connection with the carving of round work as is described below. The work support is slightly overbalanced by a weight 20 attached to a rope 21 which passes up over a pulley 22 mounted in the frame and around a pulley 23 to which its end is attached; this pulley being mounted on stud 24 supported in an arm 47 adjustable on the frame 1. The stud 24 also carries a gear 25 in mesh with a pinion 26 on shaft 27 mounted to turn in the frame 1. The other end of the shaft 27 carries a holding ratchet 28 (controlled by pawls 38, 39) by means of which the shaft 27 is allowed to be turned step by step by the draft of the weight 20 to turn the pinion 26, gear 25 and pulley 23. From pulley 23$^b$, also on stud 24, runs a rope 29 passing down and attached to run around a pulley 30 on shaft 31 supported in the frame, the shaft 31 also carrying a gear 32 in mesh with a pinion 33 on shaft 34 which has at its outer end a hand wheel 35. The shaft 31 also carries a second pulley 36 for purposes described below. The shaft 31 is thus operated by the weight 20 when the ratchet 28 is allowed to turn. A rope 37, one end of which is attached to the bracket 51, passes up and over the pulley 12 mounted to turn on the stud having its bearings in the extension 11 of the post and around a pulley 36 located on shaft 311 behind the work support. The shaft 311 preferably carries two pulleys 36 one at each end thereof. One of these pulleys is shown in Fig. 2 and the other in Fig. 1 at the right end of the shaft. The one, not shown in Fig. 1, is behind the left hand rod 6 and so cannot be seen. The shaft 31 and its continuation shaft 311 are connected by a sleeve 312 and a pin 313 which serves to couple 31 and 311 together. When the pin 313 is removed the shaft 31 rotates in the sleeve 312 without rotating the shaft 311. Thus the ropes 29 and 37 adjust and feed the height of the work support, the hand wheel 35 being used for its primary adjustment. While the machine is in operation the feed is made automatically by means of the ratchet 28, which is turned by the weight step by step as the pawls 38 and 39 are operated to release it, when the tool carriage reaches the end of its throw. These pawls are mounted on a lever 40 and act as an escapement on the ratchet 28, the weight 20 tending to lift the work support in the form of my invention shown through ropes 21, 29 and 37 and the ratchet holding it back. The lever 40 is mounted on a stud 41 and is operated by means of a rack 42 which engages the finger 43 adjustably mounted on the lever 40 as below described, though by reversing the ratchet and diminishing the weight the work support will tend to lift the weight. A weight 44 keeps the finger 43 in contact with the rack 42. The lever 40 has at its outer end a notch 45 which may be engaged by a swinging arm 46 when it is desired to lift the finger 43 out of contact with the rack 42 for any length of time, as may be the case if using the machine by hand.

The speed of the feed may be changed at any time by changing the pinion 26 on shaft 27, and in order that this may be readily accomplished the arm 47 carrying the stud 24 is pivoted to the frame at 471 and has an adjusting slot 48 by means of which and a suitable screw the position of the outer end of the lever 47 and hence of the shaft 24 may be adjusted. To change the speed, the outer end of the lever 47 is freed and allowed to lower, thus disengaging gear 25 from pinion 26. The pinion may then be readily changed and the outer end of the lever 47 be raised so as to bring the gear and pinion into mesh, and then clamped in proper position.

The tools a are rotary and may be of any desired kind and each is mounted in its own frame and operated by its own motor 66. The tool frames are mounted in a carriage which comprises a bottom rail 53, a top rail 58 and posts 57 connecting the two. The bottom rail 53 has supporting rolls 54 which run on track 55 on the base 1 and side friction rolls 56 to steady the carriage in its movement. The top rail 58 also has side rolls 59 bearing on the frame to hold the carriage in vertical position. 60, 60 are brackets forming part of the carriage, one at the top and the other at the bottom, i. e. above and below the table 3, and connected together by rods 601 mounted in clamps 602 carried on extensions from the brackets 60.

63, 63 are horizontal bars pivotally mounted at 62 to the bottom and top rails 53 and 58 and carrying between them posts 61 and 64. The tool frame is mounted on a post comprising the motors 66 and their supports and carried between the horizontal bars 63. One motor is provided for each tool. The lowest motor is mounted on an upright 651 which is mounted to swing in the lower horizontal bar 63. The other motors are mounted above the lower motor, being separated by and supported upon uprights 65, the whole forming a composite post which is supported between the horizontal bars 63, the upper motor carrying for this purpose a top support 652 which is turnable in the top horizontal bar 63. Struts 72 are pivotally mounted to the motors 66 to swing in a vertical plane. The struts are pivotally connected together at their right ends (see Fig. 3) by a vertical bar 721.

The tool support frame is held under tension between the springs 631 and 632. The springs 631 are expansion springs connecting the horizontal bars 63 with the extension 634 of the bracket 60, while the springs 632 are compression springs surrounding rods 633 attached to extensions 634 of the brackets 60, these springs 632 being compressed on their rods between the bars 63 and adjustable collars 635. This construction holds the tools in the tool frame to their work, but at the same time allows the frame as a whole to yield horizontally as required by the pattern acting through the follower.

The clamp 602 carries a rod 603 pivotally connected thereto and having a collar to which the post comprising the motors is attached. An arm 731 runs rearward from the rear of the follower carrier to the motor-carrying post and has pins 73 which are engaged by the forked end of an adjustable rod 74 which is also carried by the rod 603. A spring 732 also connects the arm 731 with the clamp 602 so that the various tool carriers will have a slightly yielding movement with relation to the work. This mechanism allows the tools to be adjusted according to the position of the work table and the thickness of the blank on which the tools are to work.

The tool holders are indicated at 69 and each is rotated by a belt system comprising pulleys 67 and belts 68 operated by its motor 66, 681 being devices of ordinary construction for regulating the belt tension. The follower holder 691 does not require to be rotated.

This swinging tool carrying frame may be moved over the work by hand in which case the spring 70 holds the frame in place but allows it to have a yielding movement to conform to the contour of the model over which the follower runs.

The tool may be rotatably mounted in any desired way, though I prefer the way shown in Figs. 9 to 13, inclusive, in which the end of the strut is shown at 72. 692 is the shaft carrying the tool holder and mounted in the end of the strut in any convenient way, preferably in ball bearings and carrying the pulley 67. As this arrangement is common to mechanisms of this kind and is illustrated clearly in the drawings, it is not further described. The element of novelty shown comprises the use in the tool chuck of a collar 693 which is conical at both ends, its outer end setting into the clamping sleeve 694 and its inner end setting into a short sleeve 695 which is carried on the end of the tool socket 696, the advantage of this construction being that in devices of this kind the socket is apt to split under pressure. This in the ordinary construction requires the stopping of the machine and the replacing of the entire socket. In my construction the splitting strain comes on the sleeve 695 which may be removed and a new sleeve substituted in a very short time.

When it is desired to reproduce a pattern in duplicate and in reverse duplicate, two work tables may be used as shown in Figs. 14 and 15 where 3 represents a table swung and operated in all respects like the table 3 in Figs. 1 and 2. 3' represents a second table hung above table 3 and counterbalancing it by means of the rope 300 and pulley 301 mounted on the frame, the table 3' having brackets 501, 510 which slide on the rods 6, so that as the table 3 is fed up the table 3' is fed down.

The tool carriage is fed longitudinally of the machine by means of the screw rod 75 mounted in suitable bearings in the frame and rotated preferably from a motor 781 mounted on top of the frame. The screw rod 75 has on it pulleys 77, 86, 85, 84, 81 and 82, all of which are loose except pulley 82. Pulleys 77 and 86 are connected and are loose on rod 75. A belt 782 runs from the motor shaft to the pulley 86 from which it may be shifted to loose pulley 85 or to pulley 84 as below described. The rotation of pulley 86 by the belt 782 causes the rotation of pulley 77 which is connected to it. Belt 76 running over pulley 77 rotates pulley 78 which is fast on a shaft carrying also freely rotating pulleys 79 and 791. A belt 83 runs from pulley 791 to pulley 82, these two pulleys being speed pulleys. Pulleys 84 and 81 are connected so that when belt 782 is shifted onto 84 pulley 81 rotates with it and by means of the twisted belt 80 gives a reverse rotation to pulley 79 and speed pulleys 791 and 82 and the rod 75 and hence changes the direction of motion of the carriage.

To shift the belt an ordinary belt shipper is used which comprises a slidable rod 871 carrying a fork 87 and is connected to mechanism of ordinary character operated by a weighted lever 88, 87 being the fork within which the belt 782 runs. This weighted lever is connected to the rod 871 by a link 881. To operate the shipper I have shown a slidable rod 89 extending lengthwise of the machine and provided at various points with adjustable lugs 90 adapted to be engaged by the posts 91 on the tool carriage. As the carriage advances to the right (see Fig. 1) the post 91 comes in contact with a lug 90 and pushes the rod 89 to the right. This action causes a pin 92 on the rod 89 to engage the lever 88 and throw it to the right, thus shipping the belts from one pulley to the reverse pulley in the ordinary way, that is, by the momentum of the overweighted lever 88. Whereupon the rotation of the screw shaft 75 is reversed and the carriage begins its travel in the opposite direction. The amount of the feed will depend upon the rack 42. This rack is mounted on collars 421 which slide on the rod 89 between pins 422 which are set in holes 423. There are a number of these holes so that the rack may be made stationary on the rod or may be allowed to slide thereon as desired. As the riding of the finger 43 up a tooth on the rack lets off one tooth of the ratchet and so allows the work support to move say $\frac{1}{32}$ of an inch and as the location of the rack may be changed and the location of the finger 43 may be changed on 40 and a block or plate 422 may be attached to the rack to act as a stop to restrict the travel of the finger 43 to one tooth, a variety of adjustments of the vertical movement of the work support may be made. It will be noted that the travel of the rod 89 may be as much as six or seven inches.

On the rod 89 is mounted the rack 42 above referred to so that with each reverse of the carriage there is corresponding action taking place between the finger 43 and rack 42 to cause the vertical feed of the work support. The amount of this feed will depend upon the adjustment of the feed mechanism to the work being done, but presumably it will be in the neighborhood of $\frac{1}{32}$ of an inch, or less, for each reciprocation of the tools.

The tool carriage is connected with the screw 75 preferably by means of a half nut shown in Figs. 5, 6, 7 and 8. To one of the posts 57 is attached a strap 93 to which is connected a clamp box 94 which contains a chamber 95, the flooring of which chamber is plain to act as a bearing for the screw 75. In the chamber 95 is a half nut 97 which is threaded to engage the upper surface of the screw and is shaped to slide within the chamber so that it may be used to grip the screw and thus so connect the tool carriage with it that rotation of the screw will feed the carriage. This member 97 has an opening 98 through it in which is located an eccentric 99 the shaft 100 of which passes outside the box and is operated by a handle 101. It will be seen that by turning the handle and hence turning the eccentric the location of the half nut in the box with relation to the screw may be adjusted so that it will engage the screw or the clamp member may be loosened from the screw and hence the carriage and the screw disconnected and the screw will not feed the carriage.

The machine as above described is particularly adapted to hold flat work. In Figs. 16 to 18 are illustrated means for carving round work such as table legs or the like.

For this purpose I provide two work frames which are bolted to the work table 3. These frames are similar, one of them being shown in Figs. 16, 17 and 18. The frame shown at 120 carries a number of chucks (two are shown in Fig. 17) and the mechanisms for rotating the work. The other frame (not shown) carries a corresponding number of tail pieces, between which and the chucks the various pieces of work and the pattern are held so that all will be carved at the one operation according to the pattern. Between the chucks in these frames the work is held much as in a lathe. The construction and operation to be described is such that after the work is in place and the machine is started up the tools pass forward and back over the work as when flat work is being carved, the tools being of the same class as in flat work. Between the transits of the tools the work is given a very slight partial rotation. For this purpose the pin 313 is removed to leave the shaft 31 free to move in the sleeve 312 as a bearing, so that the traverse of the work will as in flat work give the feed an intermittent rotary movement instead of a vertical movement. As the pulley 36 is on the disconnected shaft 311 it will not be affected and so the table will not be fed. In order that the work frames above referred to may not interfere with the ordinary tool carriers the easel 3 should be drawn back as is indicated in Fig. 16 by turning the handle 191 so as to leave room between the front of the easel and the tool carrying frame and tool carriers to allow the work to be properly mounted on the easel. This will bring the pulley 121 over the pulley 361 and sufficiently in vertical line therewith to allow power to be transmitted from the pulley 361 to the pulley 121 on shaft 122. This shaft is mounted in bearings in the frame 120 and extends vertically to a sufficient height to accommodate the amount of work required. The shaft 122 carries worm gears 123 each of which rotates a work holder or chuck. A cross section of the work frame 120 is shown in Fig. 18, the section being taken to show the feeding chuck. This chuck comprises a bearing 124 which has a flange 125 by which and a nut 126 the bearing is clamped to the work frame. Within the bearing is a rotatable sleeve 127 having a collar 128 at its forward end integral therewith, the rear shoulder of which bears against the front of a cup piece 129 which is shaped to form one member of a ball bearing, the other member being the front end of the bearing 124. On the rear end of the sleeve is attached a worm gear 130, which is constructed to form with the rear edge of the bearing 124 a ball bearing so that the sleeve 124 will be rotated freely, the balls in both instances being numbered 131. This worm gear 130 is in mesh with a similar gear 123 on shaft 122.

Within the sleeve 127 is the chuck proper comprising a centre 133 the rear end of which may slide in a socket 134 containing a spring 135. In rear of this socket is an adjusting screw 136. Surrounding the centre is a chuck plate 137 having pins or otherwise constructed to fasten the work firmly thereto.

As with flat work where the table is slightly overbalanced by the weight 20 and the weight lifts the table intermittently as the ratchet 28 is let off by the traverse of the work, so in this case the work is intermittently rotated by the weight but instead of the weight acting against the weight of the table it acts against the force of a helical spring 139 in the casing 138. The further end of the spring is attached to the casing and its inner end to the bearing 124 which is stationary. The casing has on its face 140 a socket 141 into which fits a spring-controlled pin 142 which projects from the gear 130 so that the casing and gear turn together and thus wind up the spring. As stated above, the gear turns the sleeve 127 and the work.

If it is desired to reset the work, this may be done by means of the gear 143 on shaft 122 and worm 144 on the shaft 145. The normal position of shaft 145 is shown in Fig. 18, it being held in this position by spring 146 bearing at one end on the frame 120 and at the other end on the collar 147. The worm 144 may be pulled into mesh with the gear 143 and on turning the shaft 145 by hand wheel 149 the shaft 122 and the centres may be turned to any desired extent.

The above describes my invention in the best form now known to me. Its important novelty lies in the horizontal tool feed combined with a feed for the work caused by a vertical draft, and this feature may be otherwise embodied. Moreover my invention in its various details may be varied in embodiment from the form shown.

As described above the machine is automatic. The tool frames are mounted to swing about a pivot 150, but they are connected and will be moved together so long as the brace 151 is connected at one end to the composite post comprising the motors and at the lower end to the lower frame as shown in Fig. 1. By removing this brace the tool system may be guided by hand if for example it is designed to go over a small portion of the work a second time. The means for releasing the weight comprising the ratchet and engaging pawls may be termed an escapement, and is of a character which has proved very useful in this connection.

It is believed that the operation of my machine will be understood from the above description of the various parts in relation to each other. Briefly it is as follows:—

The work is attached to the table 3 in any desirable way. Tables for this purpose being well known in the art, it is believed that no reference thereto will be necessary. Opposite the follower $b$ is placed a pattern. The table is preferably adjustable so that the top line of the pattern will be engaged by the follower. The motor being then started the belt 782 is shifted onto the pulley 86, where it is shown in Fig. 1, the traverse of the tool frames is toward the right in Fig. 1 until the pin 91 has reached the appropriate lug 90 which has been properly adjusted on the rod 89. At this time the overweighted lever 88 is thrown by one of the pins 92 so that the belt is shifted onto the pulley 84 and the rotation of the screw 75 is reversed when the movement of the tool frames is reversed until the pin 91 strikes another lug 90 and again throws the rod 89 so as to shift the belt 782 again back onto the pulley 86. It will be noted from Fig. 4 that this movement of the rod 89 causes the finger 43 to ride up over one of the inclines 42, thus moving the lever which carries the pawls 38 and 39 and allowing the ratchet 28 to move one tooth, the ratchet being caused to move by the weight 20 which as it rotates the shaft 24 gives an appropriate turn to the shaft 31—311, which turns the pulley 36, to lift the table a fraction of an inch. This process of lifting the table takes place with every reciprocation of the rod 89. Where two tables are used as shown in Figs. 14 and 15 exactly the same action takes place, the tables in this case being moved in opposite directions so that two of the tools, for example, will copy the pattern exactly where the other two tools will give its reverse, the pattern in this case being mounted on whichever of the two tables 3 or 3' is most convenient.

In carving round work the operation of these parts is exactly the same except that the pin 313 being pulled out the shaft 31 carrying the pulley 30 is rotated in the coupling 312 as a sleeve or bearing and the pulley 361 being connected with pulley 121 (see Fig. 17) the work will be turned so that the surfaces which are engaged by the tools will be lifted, that is, turned away from contact with the tools, the next line of work being presented thereto.

It will be seen that where two work supports, one of which carries the pattern, are moved in opposite directions vertically, while the tools move horizontally backward and forward, the work supported on the two tables will be similar in that both will be carved from the one pattern. The work on the table carrying the pattern will be an exact duplicate of the pattern and the work on the other table will be in reverse.

What I claim as my invention is:—

1. In a machine of the kind described, a work support having a vertical movement, and a tool frame having a horizontal reciprocating movement, and connections whereby the movement of said tool frame will control the movement of said work support.

2. In a machine of the kind described, a work support, means for moving it comprising a weight and an escapement connected thereto and adapted to allow said weight and said work support an intermittent movement.

3. In a machine of the kind described, a work support, means for moving it comprising a weight and an escapement connected thereto and adapted to allow said weight and said work support an intermittent movement, a tool carriage and means for giving said tool carriage a horizontal movement, and connections between said tool carriage and said escapement whereby said tool carriage will release said escapement.

4. In a machine of the kind described, a work support, means for moving it comprising a weight and an escapement connected thereto and adapted to allow said weight and said work support an intermittent movement, a tool carriage and means for giving said tool carriage a horizontal movement, and connections between said tool carriage and said escapement whereby said tool carriage will release said escapement at every traverse of said tool carriage.

5. In a machine of the kind described, a horizontally reciprocating tool carriage carrying one or more tools, a work support, means for adjusting the support toward and from the path of the tools, and means for feeding progressively the work carried by said work support to said tools.

6. In a machine of the kind described, a work support, a horizontally reciprocating tool carriage having tools and having individual motors, one for each tool, and means for connecting each motor with its tool, and means for causing the tools to engage the work with a yielding engagement, about a vertical axis.

7. In a machine of the kind described, a work support, a horizontally reciprocating tool carriage having tools, yielding means for holding the tools in contact with the work, and yielding connections whereby the tools will be drawn horizontally over the work.

8. In a machine of the kind described, a work support, a tool carriage, and an articulated tool frame mounted on said carriage and carrying tools, whereby the tools may be fed to the work by hand, in combination with a brace adapted to convert the tool carriage into a rigid frame whereby it may be operated automatically.

9. In a machine of the kind described, a frame, a reciprocating tool carriage having tools, a vertically moving work table, and means for adjusting the work table horizontally toward and from the tools comprising segment racks mounted on said frame and pinions connected to said work table and in mesh with said racks whereby the rotation of said pinions will cause them to travel in said racks.

10. In a machine of the kind described, a work support, a track, a tool carriage mounted to run on said track, and a tool frame mounted on said carriage and adapted to swing horizontally thereon, and connections between said tool frame and said carriage whereby said tools will be held against the work on said support with a balanced pressure.

11. In a machine of the kind described, two vertically movable tables, means for connecting them whereby the movement of one of said tables will cause the movement of the other table, and means for operating one of said tables, in combination with a horizontally movable tool carriage having a plurality of tools, certain of said tools being located opposite each of said tables, and a follower located opposite one of said tables whereby a single pattern engaged by said follower will be reproduced and its reverse will be simultaneously reproduced as the tables are fed in opposite directions.

12. In a machine of the kind described, a work support, and means for supporting and lifting it comprising a weight, a pulley, an escapement connected to said pulley, a rope connecting said pulley and said weight, a second pulley, a rope connecting said second pulley with said table, and connections between said second pulley and said escapement whereby the movement of said escapement will operate said second pulley and said table.

13. In a machine of the kind described, a work support, and means for supporting and lifting it comprising a weight, a pulley, an escapement connected to said pulley, a rope connecting said pulley and said weight, a second pulley, a rope connecting said second pulley with said table, and connections between said second pulley and said escapement whereby the movement of said escapement will operate said second pulley and said table, in combination with a horizontally reciprocating tool carriage, and means operable at each traverse of the tool carriage whereby said escapement will be released and said work support will be fed.

JOSEPH JANES.